(12) United States Patent
Zhu et al.

(10) Patent No.: US 9,882,649 B2
(45) Date of Patent: Jan. 30, 2018

(54) TRANSMITTING, RECEIVING AND COMMUNICATION SYSTEMS OF OPTICAL NETWORK AND METHOD FOR MODULATING SIGNAL

(71) Applicant: ZTE Corporation, Shenzhen (CN)

(72) Inventors: Songlin Zhu, Shenzhen (CN); Yong Guo, Shenzhen (CN); Yongjia Yin, Shenzhen (CN); Yang Gao, Shenzhen (CN); Guanjun Zeng, Shenzhen (CN); Dezhi Zhang, Shenzhen (CN); Weifeng Tong, Shenzhen (CN)

(73) Assignee: XI'AN ZHONGXING NEW SOFTWARE CO. LTD., Xi'An (CN)

(*) Notice: Subject to any disclaimer, the term of this patent is extended or adjusted under 35 U.S.C. 154(b) by 0 days.

(21) Appl. No.: 14/646,409

(22) PCT Filed: Aug. 14, 2013

(86) PCT No.: PCT/CN2013/081494
§ 371 (c)(1),
(2) Date: May 21, 2015

(87) PCT Pub. No.: WO2014/079237
PCT Pub. Date: May 30, 2014

(65) Prior Publication Data
US 2015/0288456 A1 Oct. 8, 2015

(30) Foreign Application Priority Data
Nov. 21, 2012 (CN) .......................... 2012 1 0476566

(51) Int. Cl.
*H04B 10/516* (2013.01)
*H04B 10/556* (2013.01)
(Continued)

(52) U.S. Cl.
CPC ....... *H04B 10/5161* (2013.01); *H04B 10/272* (2013.01); *H04B 10/541* (2013.01); *H04B 10/5561* (2013.01)

(58) Field of Classification Search
CPC .................................... H04B 10/516–10/5563
See application file for complete search history.

(56) References Cited

U.S. PATENT DOCUMENTS

2009/0238571 A1* 9/2009 Nakamura ....... H04B 10/07951
398/97
2011/0078755 A1* 3/2011 Dai ........................ H04H 20/69
725/111
(Continued)

FOREIGN PATENT DOCUMENTS

CN 102202245 A 9/2011
CN 102263726 A 11/2011
(Continued)

OTHER PUBLICATIONS

Quadrature Amplitude Modulation, White paper published by National Instruments Nov. 2014 at http://www.ni.com/white-paper/3896/en/.*
(Continued)

*Primary Examiner* — David Payne
*Assistant Examiner* — Casey Kretzer
(74) *Attorney, Agent, or Firm* — Cantor Colburn LLP

(57) ABSTRACT

Provided are transmitting, receiving and communication systems of an optical network and a method for modulating a signal. The transmitting system includes: first Passive Optical Network (PON) equipment, configured to output a binary digital signal; and an M-order digital modulator, configured to modulate the binary digital signal into an M-order digital signal, and output the M-order digital signal, wherein each transmission symbol in the M-order digital signal carries information of $N=\log_2^M$ bits, where N is a
(Continued)

natural number greater than 1 and M is a natural number. By the disclosure, the problems in the related art is solved, the bandwidths required by transmission are further reduced, and the actual cost of the optical transceiver modules is lowered.

15 Claims, 10 Drawing Sheets

(51) Int. Cl.
*H04B 10/54* (2013.01)
*H04B 10/272* (2013.01)

(56) References Cited

U.S. PATENT DOCUMENTS

| | | | | |
|---|---|---|---|---|
| 2011/0255875 A1* | 10/2011 | Mertz | ............... | H04B 10/5561 398/183 |
| 2012/0141135 A1* | 6/2012 | Yang | .................. | H04B 10/516 398/140 |
| 2012/0281988 A1* | 11/2012 | Kikuchi | ............ | H04B 10/5561 398/159 |
| 2013/0230324 A1* | 9/2013 | Gupta | ................ | H04L 12/2885 398/66 |

FOREIGN PATENT DOCUMENTS

| EP | 1746857 A1 | 1/2007 |
|---|---|---|
| GB | 2440584 A | 2/2008 |
| JP | 201093600 A | 4/2010 |

OTHER PUBLICATIONS

International Search Report for corresponding application PCT/CN2013/081494 filed Aug. 14, 2013; dated Nov. 28, 2013.
Miyamoto et al.: "Novel Modulaltion and Detection for Bandwith-Reduced RZ Formats Using Duobinary-Mode Splitting in Wideand PSK/ASK Conversion", Jpurnal of Lightwave Technology, vol. 20., No. 12; Dec. 2002; pp. 12.
Supplemental European Search Report No. EP13856892 dated Oct. 25, 2015; pp. 6.
Vladimir, et al.; "The Influence of Binary Modulations in Passive Optical Network Based on WDM", Telecommunications and Signal Processing(TSP), XP031975229, Aug. 18, 2011, pp. 4.

* cited by examiner

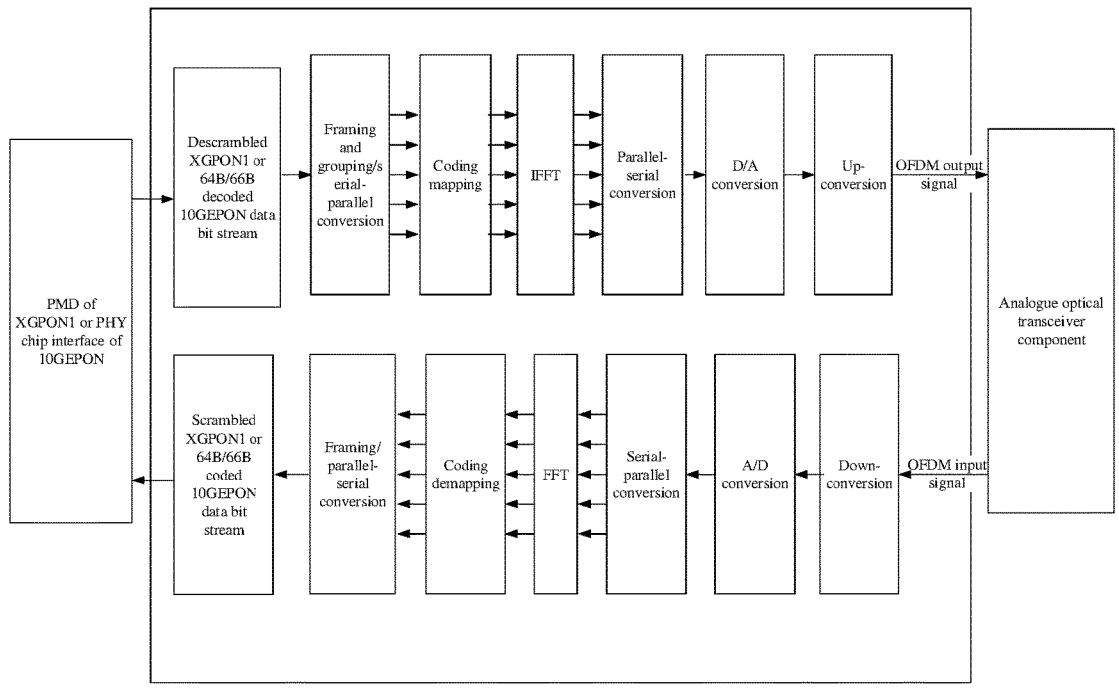
FIG. 10
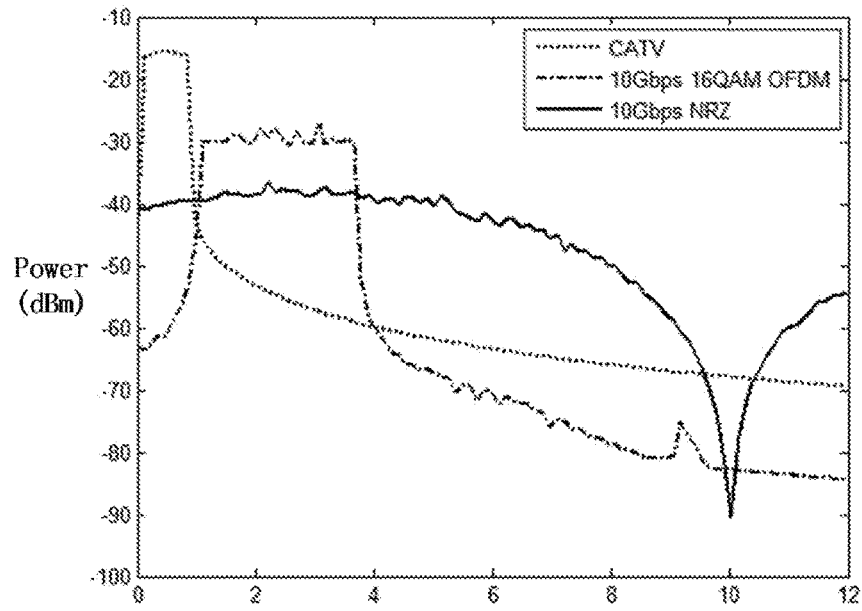
FIG. 11　Frequency (GHz)

TRANSMITTING, RECEIVING AND COMMUNICATION SYSTEMS OF OPTICAL NETWORK AND METHOD FOR MODULATING SIGNAL

TECHNICAL FIELD

The disclosure relates to the field of communication, including e.g., transmitting, receiving and communication systems of an optical network, and a method for modulating a signal.

BACKGROUND

A conventional Time Division Multiplex (TDM) Passive Optical Network (PON) belongs to a binary digital modulation optical communication system. A Physical Medium Dependent (PMD) layer or Physical (PHY) layer of the conventional TDM-PON adopts a binary digital modulation technology. For example, a Gigabit Passive Optical Network (GPON) and a 10-Gigabit-Capable Passive Optical Network (XG-PON1) adopt a scrambled binary Non-Return-to-Zero (NRZ) code, and an Ethernet Passive Optical Network (EPON) and a 10G EPON adopt 8b/10b and 64b/66b line coding NRZ. A low-frequency component of an electric power spectral density of a binary NRZ code of the conventional TDM-PON is superimposed with an electric power spectral density of a Radio Frequency (RF) video signal transmission system.

When a Wavelength Division Multiplexing (WDM) technology is adopted for coexistence of an RF video system and a TDM-PON system in the same Optical Distribution Node (ODN), an RF video signal and a downlink signal of the TDM-PON system are transmitted in the same direction in the same optical fibre with their power spectral densities superimposed, which causes a Raman scattering effect of transmission of different wavelengths in the same optical fibre as well as nonlinear Raman crosstalk of the downlink signal of the TDM-PON system to the RF video system, so that quality of a part of a low-frequency channel of the RF video signal is seriously degraded, and the RF video system and the TDM-PON system cannot coexist in the same ODN; and moreover, the cost of an optical transceiver component of a 10 Gbps binary digital modulation optical transmission system has reached a bearing limit of a network access user, so it is urgent to look for a technical solution for lowering the cost.

A binary digital modulation mode is adopted in most of optical communication systems in a related art, greater bandwidths are required during transmission, and optical transceiver components with higher transmission rates are required for the greater bandwidths, so that higher using cost of users and poorer practicability are caused.

SUMMARY

Transmitting, receiving and communication systems of optical network and a method for modulating a signal are provided in the embodiment of the disclosure, so as to at least solve the problems of higher using cost of a user and poorer practicability caused by the fact that a binary digital modulation mode is adopted in most of optical communication systems in the related art, greater bandwidths are required during transmission and optical transceiver modules with higher transmission rates are required by greater bandwidths.

According to a first aspect of the embodiment of the disclosure, a transmitting system of an optical network, comprising: first Passive Optical Network (PON) equipment, configured to output a binary digital signal; and an M-order digital modulator, configured to modulate the binary digital signal into an M-order digital signal, and output the M-order digital signal, wherein each transmission symbol in the M-order digital signal carries information of $N=\log_2^M$ bits, where N is a natural number greater than 1 and M is a natural number.

According to an embodiment of the disclosure, the system further comprises: first optical transmitting equipment, configured to perform optical modulation on the M-order digital signal, and transmit a modulated M-order optical signal.

According to an embodiment of the disclosure, the first PON equipment is further configured to output two paths of binary digital signals.

According to an embodiment of the disclosure, the system further comprises: second optical transmitting equipment, configured to perform optical modulation on one path of binary digital signal in the two paths of binary digital signals, and transmit a modulated binary optical signal.

According to an embodiment of the disclosure, the first PON equipment comprises one of: an Optical Line Terminal (OLT) and an Optical Network Unit (ONU).

According to an embodiment of the disclosure, the OLT at least comprises one of: a Gigabit Passive Optical Network (GPON) OLT, a 10-Gigabit-Capable Passive Optical Network (XG-PON1) OLT, a Radio Frequency (RF), and a Next-Generation Passive Optical Network (NGPON2) OLT; and the ONU at least comprises one of: a GPON ONU, an XGPON1 ONU, an RF and an NGPON2 ONU.

According to an embodiment of the disclosure, the M-order digital modulator comprises one of: Pulse Amplitude Modulation (PAM), Amplitude Shift Keying (ASK), Minimum Shift Keying (MSK), Phase Shift Keying (PSK), m Quadrature Amplitude Modulation (m-QAM), Discrete MultiTone (DMT), and Orthogonal Frequency Division Multiplexing (OFDM).

According to a second aspect of the disclosure, a receiving system of an optical network, comprising: an M-order digital demodulator, configured to demodulate a received M-order digital signal into a binary digital signal and output the demodulated binary digital signal, wherein the M-order digital signal is a signal modulated by a transmitting system through an M-order digital modulator, and each transmission symbol in the M-order digital signal carries information of $N=\log_2^M$ bits, where N is a natural number greater than 1 and M is a natural number; and second Passive Optical Network (PON) equipment, configured to receive the demodulated binary digital signal, and perform corresponding operation according to the demodulated binary digital signal.

According to an embodiment of the disclosure, the system further comprises: first optical receiving equipment, configured to perform optical demodulation on a received M-order optical signal, and output the M-order digital signal obtained through the optical demodulation.

According to an embodiment of the disclosure, the system further comprises: second optical receiving equipment, configured to perform optical demodulation on a received binary optical signal, and output the M-order digital signal obtained through the optical demodulation.

According to an embodiment of the disclosure, the second PON equipment comprises one of: an Optical Line Terminal (OLT) and an Optical Network Unit (ONU).

According to an embodiment of the disclosure, the OLT at least comprises one of: a Gigabit Passive Optical Network (GPON) OLT, a 10-Gigabit-Capable Passive Optical Network (XG-PON1) OLT, a Radio Frequency (RF), and a Next-Generation Passive Optical Network (NGPON2) OLT; and the ONU at least comprises one of: a GPON ONU, an XGPON1 ONU, an RF and an NGPON2 ONU.

According to an embodiment of the disclosure, the M-order digital demodulator comprises one of: Pulse Amplitude Modulation (PAM), Amplitude Shift Keying (ASK), Minimum Shift Keying (MSK), Phase Shift Keying (PSK), m Quadrature Amplitude Modulation (m-QAM), Discrete MultiTone (DMT) and Orthogonal Frequency Division Multiplexing (OFDM).

According to a third aspect of the disclosure, a communication system of an optical network, comprising: any one of the transmitting systems of the optical network and any one of the receiving systems of the optical network.

According to a fourth aspect of the disclosure, a method for modulating a signal, comprising: modulating an input binary digital signal into an M-order digital signal by an M-order digital modulator, wherein each transmission symbol in the M-order digital signal carries information of $N=\log_2^M$ bits, where N is a natural number greater than 1 and M is a natural number; and outputting the M-order digital signal by an optical network.

According to an embodiment of the disclosure, after outputting the M-order digital signal by the optical network, the method further comprises: demodulating a received M-order digital signal into a binary digital signal by an M-order digital demodulator; and performing corresponding operation according to the binary digital signal.

According to an embodiment of the disclosure, before modulating the input binary digital signal into the M-order digital signal by the M-order digital modulator, the method further comprises: judging whether to perform modulation by the M-order digital modulator or not; and based on that a judgment result is not to perform modulation by the M-order digital modulator, performing modulation through a binary digital modulator.

According to an embodiment of the disclosure, before judging whether to perform modulation by the M-order digital modulator or not, the method further comprises: judging whether to output both paths of received binary digital signals or not; based on that a judgment result is to output both paths of received binary digital signals, modulating the two paths of binary digital signals by the binary digital modulator and the M-order digital modulator respectively; and based on that a judgment result is not to output both paths of received binary digital signals, judging whether to perform modulation by the M-order digital modulator or not.

According to the transmitting system of the optical network provided by the embodiment of the disclosure, the M-order digital modulator is adopted to modulate the binary digital signal and output the modulated M-order digital signal. By the embodiment of the disclosure, the problems of higher using cost of a user and poorer practicability caused by the fact that a binary digital modulation mode is adopted in most of optical communication systems, greater bandwidths are required during transmission and optical transceiver components with higher transmission rates are required by greater bandwidths is solved, the bandwidths required by transmission are further reduced, and the actual cost of the optical transceiver components is lowered; and meanwhile, power spectrums can be reshaped by virtue of M-nary characteristics, so that a power spectrum of an RF signal is prevented from being superimposed with a power spectrum of a downlink signal of a PON, and the technical problem of Raman crosstalk is solved.

BRIEF DESCRIPTION OF THE DRAWINGS

The drawings are described here to provide further understanding of the disclosure, and form a part of the disclosure. The schematic embodiments and description of the disclosure are adopted to explain the disclosure, and do not form improper limits to the disclosure. In the drawings:

FIG. 10 is a structure diagram of binary digital modulation and OFDM conversion upgrading according to a first example embodiment of the disclosure;

FIG. 11 is a power spectrum chart of an RF signal and an NRZ signal according to a related art;

DETAILED DESCRIPTION OF THE EMBODIMENTS

The disclosure is described below with reference to the drawings and the embodiments in detail. It should be noted that the embodiments in the disclosure and characteristics in the embodiments can be combined under the condition of no conflicts.

Figure 1:
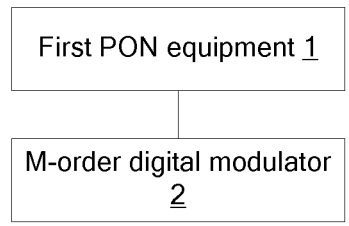
FIG. 1 is a first structure diagram of a transmitting system for an optical network according to an embodiment of the disclosure.

Based on the problems of higher using cost of a user and poorer practicability caused by the fact that a binary digital modulation mode is adopted in most of optical communication systems in the related art, greater bandwidths are required during transmission and optical transceiver components with higher transmission rates are required by greater bandwidths, a transmitting system of optical network is provided in the embodiment of the disclosure, FIG. 1 shows the structure diagram of the system, and the system includes:

first PON equipment 1, configured to output a binary digital signal; and an M-order digital modulator 2, coupled with the first PON equipment 1 and configured to modulate the binary digital signal into an M-order digital signal, and output the M-order digital signal, wherein each transmission symbol in the M-order digital signal carries information of $N=\log_2^M$ bits, where N is a natural number greater than 1 and M is a natural number.

According to the transmitting system of the optical network provided by the embodiment, the M-order digital modulator is adopted to modulate the binary digital signal and output the modulated M-order digital signal. By the embodiment of the disclosure, the problems of higher using cost of the user and poorer practicability caused by the fact that the binary digital modulation mode is adopted in most of optical communication systems, greater bandwidths are required during transmission and the optical transceiver components with higher transmission rates are required by greater bandwidths is solved, the bandwidths required by transmission are further reduced, and the actual cost of the optical transceiver components is lowered; and meanwhile, power spectrums can be reshaped by virtue of M-nary characteristics, so that a power spectrum of an RF signal is prevented from being superimposed with a power spectrum of a downlink signal of a PON, and the technical problem of Raman crosstalk is solved.

Figure 2:
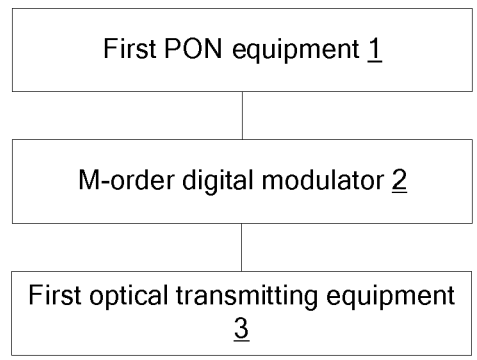
FIG. 2 is a second structure diagram of a transmitting system for an optical network according to an embodiment of the disclosure.

In an implementation process, the transmitting system may, as shown in FIG. 2, further include first optical transmitting equipment 3, coupled with the M-order digital modulator 2 and configured to perform optical modulation on the received M-order digital signal, and transmit a modulated M-order optical signal. Such a process is to perform optical modulation processing on the M-order digital signal output by the M-order digital modulator 2 so as to achieve higher signal fidelity.

Figure 3:
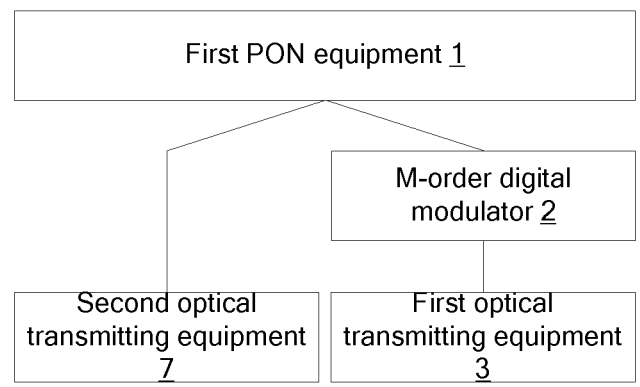
FIG. 3 is a third structure diagram of a transmitting system for an optical network according to an embodiment of the disclosure.

In the abovementioned implementation process, the first PON equipment 1 may further be configured to output two paths of binary digital signals. At this moment, the transmitting system can be combined with an existing system for use, and then the system may further include second optical transmitting equipment 7, configured to perform optical modulation on one path of binary digital signal in the two paths of binary digital signals, and transmit a modulated binary optical signal, as shown in FIG. 3.

Figure 4:
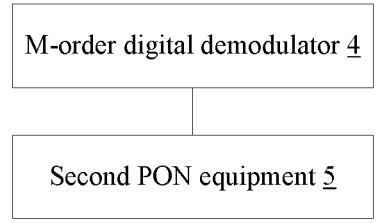
FIG. 4 is a first structure diagram of a receiving system for an optical network according to an embodiment of the disclosure.

A receiving system of an optical network is further provided in the embodiment of the disclosure, which may be configured to receive a transmitted signal from the abovementioned transmitting system of the optical network, FIG. 4 shows its structure diagram, and the system includes:

an M-order digital demodulator 4, configured to demodulate a received M-order digital signal into a binary digital signal and output the demodulated binary digital signal, wherein the M-order digital signal is a signal modulated by a transmitting system through an M-order digital modulator, and each transmission symbol in the M-order digital signal carries information of $N=\log_2^M$ bits, where N is a natural number greater than 1 and M is a natural number; and second PON equipment 5, coupled with the M-order digital demodulator 4 and configured to receive the demodulated binary digital signal, and perform corresponding operation according to the demodulated binary digital signal.

Figure 5:
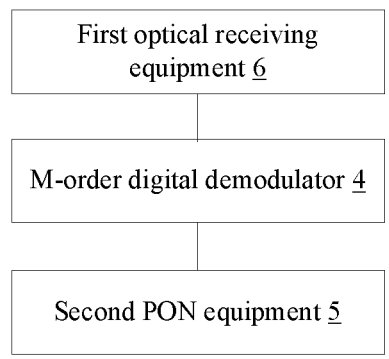
FIG. 5 is a second structure diagram of a receiving system for an optical network according to an embodiment of the disclosure.

When the transmitting system transmits an M-order optical signal, the receiving system may, as shown in FIG. 5, further include: first optical receiving equipment 6, coupled with the M-order digital demodulator 4 and configured to perform optical demodulation on the received M-order optical signal, and output the M-order digital signal obtained through the optical demodulation.

Figure 5A:
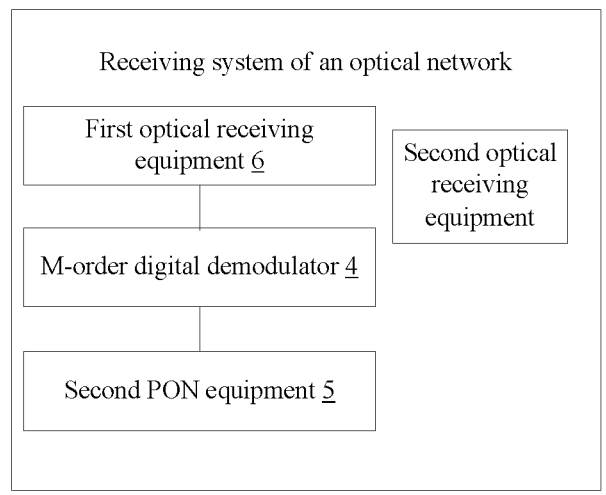
FIG. 5a is a second structure diagram of a receiving system for an optical network according to an example embodiment of the disclosure.

When an existing system is combined with the terminal system in the embodiment, the receiving system may further include second optical receiving equipment, as shown in FIG. 5a, configured to perform optical demodulation on a received binary optical signal, and output the M-order digital signal obtained through the optical demodulation.

Wherein, the first PON equipment and the second PON equipment are different, and for example, when the first PON equipment is an OLT, the second PON equipment is an ONU; and when the first PON equipment is an ONU, the second PON equipment is an OLT. During implementation, the OLT and the ONU correspond to each other, and for example, when the OLT is a GPON OLT, and RF or an XGPON1 OLT, the ONU is a GPON ONU, an RF and an XGPON1 ONU. Wherein, there are many kinds of OLTs or ONUs, for example, GPON OLT, XGPON1 OLT (RF) and NGPON2 OLT and so on. The M-order digital modulator or the M-order digital demodulator may also be any one of the following: PAM, ASK, MSK, PSK, m-QAM, DMT and OFDM.

Figure 6:
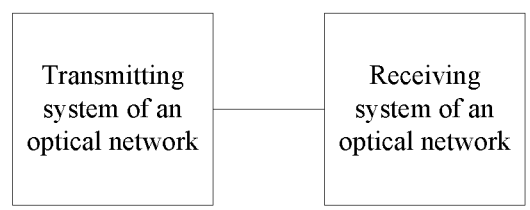
FIG. 6 is a structure diagram of a communication system for an optical network according to an embodiment of the disclosure.

A communication system of an optical network is further provided in the embodiment of the disclosure, FIG. 6 shows the structure diagram of the communication system, and the communication system includes the abovementioned transmitting system of the optical network and the abovementioned receiving system of the optical network.

Figure 7:
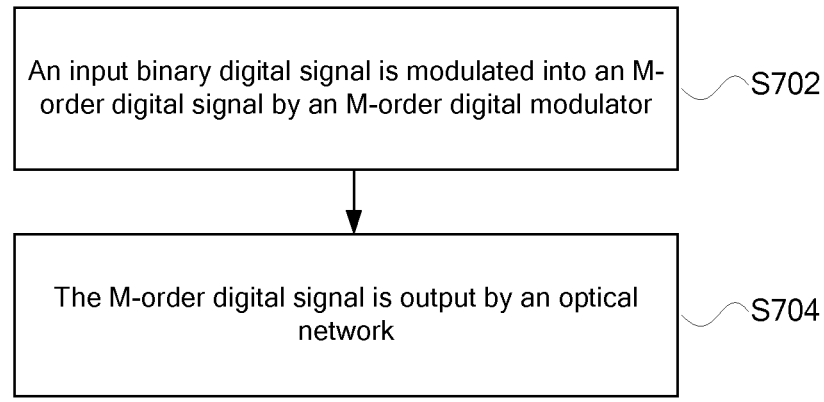
FIG. 7 is a flowchart of a signal modulation method according to an embodiment of the disclosure.

Based on the abovementioned communication system of the optical network, a method for modulating a signal is further provided in the embodiment, FIG. 7 shows an implementation flow of the method, and the method includes Step 702 to Step 704:

Step 702: An input binary digital signal is modulated into an M-order digital signal through an M-order digital modulator, wherein each transmission symbol in the M-order digital signal carries information of $N=\log_2^M$ bits, where N is a natural number greater than 1 and M is a natural number; and

704: The M-order digital signal is output through an optical network.

After Step 704 is executed, the received M-order digital signal may further be performed optical modulation; and then the modulated M-order optical signal is transmitted.

Opposite receiving equipment may demodulate the M-order optical signal after receiving the M-order optical signal, and outputs the demodulated M-order digital signal. The output M-order digital signal is demodulated into a binary digital signal through an M-order digital demodulator, and then corresponding operation is performed according to the binary digital signal.

In an implementation process, when two paths of signals are input, whether to output both received paths of binary digital signals or not is judged. When both paths are to be input, the two paths of binary digital signals are modulated through a binary digital modulator and an M-order digital modulator respectively. When only one of the two paths of signals is to be input, the signal is selectively input into the binary digital modulator or the M-order digital modulator according to a condition. When the signal is selected to be input into the binary digital modulator, the signal is modulated according to an existing binary digital modulation process. When the signal is selected to be input into the M-order digital modulator, the signal is modulated and output according to the abovementioned method.

Figure 8:
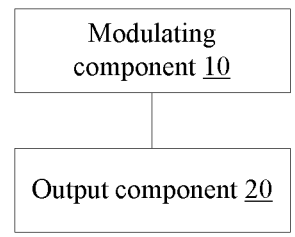
FIG. 8 is a first structure diagram of a signal modulation device according to an embodiment of the disclosure.

A device for modulating a signal is further provided in the embodiment of the disclosure, which may include two parts, wherein a first part is configured to realize a transmitting function, and a second part is configured to realize a receiving function. The device may be arranged in two entities according to the realized functions. The conditions that the two parts of the device are arranged in different entities are described below. FIG. 8 shows the structure diagram of the device configured to realize the transmitting function, and the device includes: a modulating component 10, configured to modulate an input binary digital signal into an M-order digital signal through an M-order digital modulator, wherein each transmission symbol in the M-order digital signal carries information of $N=\log_2^M$ bits, where N is a natural number greater than 1 and M is a natural number; and an output component 20, coupled with the modulating component 10 and configured to output the M-order digital signal through an optical network.

Figure 9:
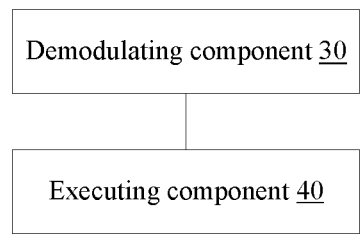
FIG. 9 is a second structure diagram of a signal modulation device according to an embodiment of the disclosure.

In an optional embodiment, the device configured to realize the receiving function may, as shown in FIG. 9, include: a demodulating component 30, configured to demodulate a received M-order digital signal into a binary digital signal through an M-order digital demodulator; and an executing component 40 coupled with the demodulating component 30 and configured to perform corresponding operation according to the binary digital signal.

The device may be arranged to be two independent sub-devices which are arranged at a transmitting party and a receiving party according to different functions of the components respectively, those skilled in the art can arrange the device according to the functions of the components, and details will not be given here.

First Optional Embodiment

An implementation method for coexistence of multiple PONs, RFs and the like in an ODN is provided in the embodiment of the disclosure, and in the implementation method, a multi-nary digital modulation technology is adopted for modulation, so that the amount of information contained within a unit bandwidth can be increased, and spectral efficiency is further improved. A signal bandwidth occupied by an M-nary (M is greater than 2) digital modulation technology may be $1/\log_2^M$ of a signal bandwidth occupied by the binary digital modulation technology. A working bandwidth of an optical transceiver component is reduced, which may greatly lower the cost of the optical transceiver component. Meanwhile, a novel multi-nary digital modulation technology further has power spectrum reshaping and spectrum conversion functions, so that a TDM PON system adopting spectrum reshaping and spectrum conversion technologies may reduce and even eliminate nonlinear Raman crosstalk to an RF Video system. Conversion between a binary digital modulation signal and a multi-nary digital modulation signal may be implemented by an Application Specific Integrated Circuit (ASIC) chip, which can convert an original binary digital modulation optical communication transmission system into a multi-nary digital modulation technology-based optical communication transmission system. Of course, the whole original binary digital modulation optical communication transmission system may be directly converted into an M-nary system without conversion by the ASIC chip, and such direct conversion is more complicated than conversion by the ASIC chip, but still can achieve the same effect.

For example, an OFDM modulation and demodulation technology belongs to one of novel binary digital modulation technologies. An OFDM modulation principle is to perform framing and grouping, serial-parallel conversion, coding mapping (digital modulation technology QAM), digital Inverse Fast Fourier Transform (IFFT) processing and parallel-serial conversion on binary input signals, generate OFDM electric signals by virtue of Digital-to-Analogue Conversion (DAC), perform optical carrier modulation and transmission on the converted electric signals, wherein the modulated electric signals is transmitted on optical fibres.

An OFDM demodulation technical principle is usually to convert a optical carrier modulated signal received by a optical detector into an OFDM electric signal, perform Analogue-to-Digital Conversion (ADC), serial-parallel conversion, digital Fast Fourier Transform (FFT) processing, perform decoding mapping and parallel-serial conversion and restore a binary digital signal by framing, as shown in FIG. 10.

In the OFDM modulation technology, a power spectral density of an OFDM modulated signal presents a steep drop characteristic compared with that in a simple binary digital modulation technology, and such a characteristic can effectively limit the out-of-band crosstalk of the signal. As shown in FIG. 11, the superimposition of power spectral densities of a conventional binary modulation signal (NRZ signal at a rate of 10 Gb/s) and the power spectral densities of an RF signal may cause serious nonlinear Raman crosstalk and influence on the coexistence of a TDM PON signal and the RF signal. But the OFDM signal has a relatively high power spectral density, and OFDM spectrum shifting can be combined to completely shift the power spectral density of the OFDM signal out of a main power spectral density of the RF signal, thereby effectively reducing or eliminating the nonlinear Raman crosstalk between the OFDM signal and the RF signal. During implementation, the shifting and regulation of the power spectral density of the OFDM signal can be easily implemented by a digital/RF device.

In the embodiment, a GPON and an XGPON1 or an EPON and a 10GEPON are also taken as an example. During implementation, binary modulation and demodulation and OFDM modulation and demodulation mutual conversion function chips may be connected in series with output and input ports of PMD or PHY layers of ASIC chips of OLTs and ONUs of a conventional GPON, XGPON1, EPON and 10GEPON, and meanwhile, an original binary digital modulation optical transceiver component is replaced with an OFDM digital modulation optical transceiver component, so that an original binary digital modulation optical communication transmission system is converted into an OFDM digital modulation technology-based optical communication transmission system, i.e. an M-nary digital modulation technology-based optical communication transmission system.

In an implementation process, in a transmitting direction, an OFDM function chip convert scrambled binary NRZ digital signals of the GPON and the XGPON1 and 8b/10b or 64b/66b line coded binary NRZ digital signals of the EPON and the 10GEPON into OFDM signals, and then the OFDM signals are modulated by the optical components and transmitted in the ODN. In a receiving direction, the OFDM signals are received by the optical components at first, and then the function chip with the OFDM demodulation technical converts the OFDM signals into the scrambled binary NRZ digital signals of the GPON and the XGPON1 and the 8b/10b or 64b/66b line coded binary NRZ digital signals of the EPON and the 10GEPON.

At present, in a standard NGPON2 and a standard NGEPON, some operating companies expect that downlink optical signals of the NGPON2 and RF signals can coexist in the same ODN. For the condition that the downlink optical signals of the NGPON2 and the RF signals coexist in the same ODN, the ASIC chip can implement the coexistence of the downlink optical signals of the NGPON2 and the RF signals in the same ODN in an OFDM mode.

In an implementation process, for signals in the transmitting direction, data streams of a Transmission Control (TC) layer of the NGPON2 and a Media Access Control (MAC) layer of the NGEPON are directly subjected to OFDM processing after Forward Error Correction (FEC) coding, and are transmitted through optical components. In the receiving direction, the data streams are received by the optical components, are subjected by OFDM demodulation processing for FEC decoding, and then are transmitted to the TC layer of the NGPON2 and the MAC layer of the NGEPON. For the condition that the downlink optical signals of the NGPON2 and the RF signals are not required to coexist in the same ODN, the ASIC chip may work in an ordinary binary digital modulation mode and transmit and receive the optical signals through binary digital modulation optical transceiver components (the optical components).

The binary digital modulation and M-nary digital modulation conversion upgrading of the PHY layer or direct binary digital modulation may reduce the working frequency bandwidth of the optical transceiver component by $\log_2^M$ times, greatly lower the component cost of the optical component and greatly lower the optical component cost of the whole system. Meanwhile, the superimposition of the power spectral densities of the converted TDM PON downlink signal and the RF video signal in the same direction in the frequency domain is prevented, so that nonlinear Raman crosstalk is eliminated, and the TDM PON signal and the RF video signal may coexist in the same ODN.

Second Optional Embodiment

Figure 12:
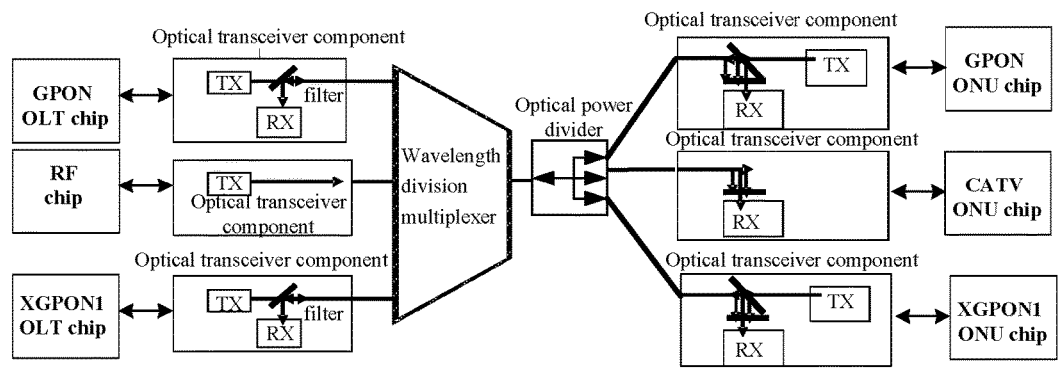
FIG. 12 is a network structure diagram of multi-network coexistence according to a second example embodiment of the disclosure.

FIG. 12 shows a structure diagram of a network supporting the coexistence of a GPON, an XGPON1 and an RF provided by the embodiment. An optical transceiver component of an OLT of an XGPON1 system transmits a downlink optical signal with the work rate of 10 Gbit/s and receives an uplink optical signal with the work rate of 2.5 Gbit/s, a transmitted downlink wavelength range is 1,575 nm to 1,580 nm, and uplink wavelength range which can be received is 1,260 nm to 1,280 nm. An optical component of an OLT of a GPON system transmits a downlink optical signal with the rate of 2.5 Gbit/s, and receives an uplink optical signal with the rate of 1.25 Gbit/s, a transmitted downlink wavelength range is 1,480 nm to 1,500 nm, and the uplink wavelength range which can be received is 1,290 nm to 1,330 nm. A transmitted wavelength range of an optical component of an RF Video system is 1,550 nm to 1,560 nm. The downlink signal of the XGPON1, the downlink signal of the GPON and the downlink signal of the RF arrive at an optical transceiver component of an ONU supporting the XGPON1 system, an optical component of an ONU supporting the GPON system and an RF signal receiving component through an ODN of the system respectively after wavelength division of a coexisting Wavelength Division Multiplexer (WDM1r) shown in FIG. 12; and the uplink signal of the XGPON1 and the uplink signal of the GPON are transmitted to respective OLT ports after wavelength combination of the WDM1r shown in FIG. 12. The optical component of the ONU of the XGPON1 system receives the downlink optical signal with the work rate of 10 Gbit/s, and transmits the uplink optical signal with the work rate of 2.5 Gbit/s, the wavelength range which can be received is 1,575 nm to 1,580 nm, and the transmitted uplink wavelength range is 1,260 nm to 1,280 nm. The optical component of the ONU of the GPON system receives the downlink 2.5 Gbit/s optical signal, and receives the uplink optical signal with the rate of 1.25 Gbit/s, the downlink wavelength range which can be received is 1,480 nm to 1,500 nm, and the transmitted uplink wavelength range is 1,290 nm to 1,330 nm. The range of the received wavelengths of the RF signal receiving component is 1,550 nm to 1,560 nm.

The coexistence of the GPON, the XGPON1 and the RF is implemented by virtue of three manners in the embodiment, and each manner is described below.

Figure 13:
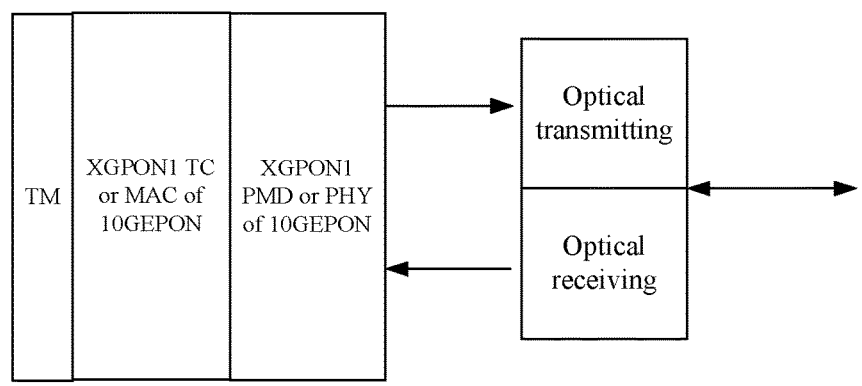
FIG. 13 is a structure diagram of an XGPON1 OLT in a related art.

Manner 1:

Digital modulation and demodulation conversion upgrading of the OLT of the XGPON1: the OLT of the XGPON1 usually includes three electric chips, i.e. a Transmission Media (TM) electric chip, a TC electric chip and a PMD electric chip, as well as an optical component, as shown in FIG. 13. Wherein, the PMD function chip interface part includes transmitting and receiving electric interfaces, and the two interfaces are interconnected with transmitting and receiving electric interfaces of the optical component. An upgrading process is implemented by plugging OFDM and demodulation technology-based function chips between the electric interfaces of the PMD electric chip and the optical component and replacing the optical component with a digital base-band optical component.

Figure 14:
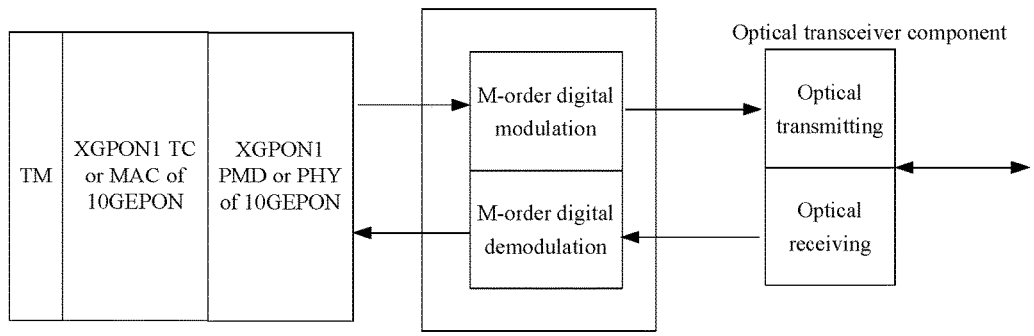
FIG. 14 is a first structure diagram of an XGPON1 OLT according to a second example embodiment of the disclosure.

In a downlink direction, the OFDM modulation and demodulation technology-based function chips convert scrambled coded binary NRZ digital signals of the GPON and the XGPON1 into OFDM signals, and then the OFDM signals are further modulated by the optical components and transmitted on the ODN. In an uplink direction, the OFDM signals transmitted by different ONUs are received and demodulated by the optical components, and are converted into the scrambled coded binary NRZ digital signals of the GPON and the XGPON1 through the OFDM modulation and demodulation technology-based function chips, and the scrambled coded binary NRZ digital signals are transmitted to the electric receiving interfaces of the PMD electric chips. The line coding conversion upgrading of the OLT of the XGPON1 is finished, and the OLT is shown in FIG. 14 after being upgraded.

Figure 15:
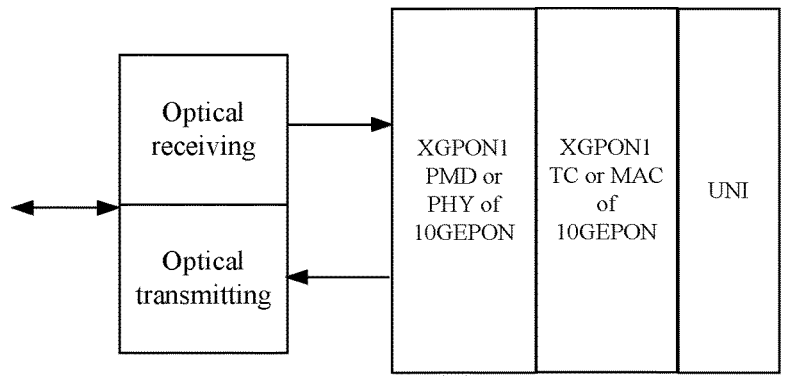
FIG. 15 is a structure diagram of an XG-PON1 ONU according to a related art.

Digital modulation and demodulation conversion upgrading of the ONU of the XGPON1: the ONU of the XGPON1 usually includes three electric chips, i.e. a User Network Interface (UNI) electric chip, a TC electric chip and a PMD electric chip, as well as an optical component, as shown in FIG. 15. Wherein, the PMD function chip interface part includes transmitting and receiving electric interfaces, and the two interfaces are interconnected with transmitting and receiving electric interfaces of the optical component. An upgrading process is implemented by plugging OFDM modulation and demodulation technology-based function chips between the electric interfaces of the PMD electric chip and the optical component and replacing the optical component with a digital base-band optical component.

Figure 16:
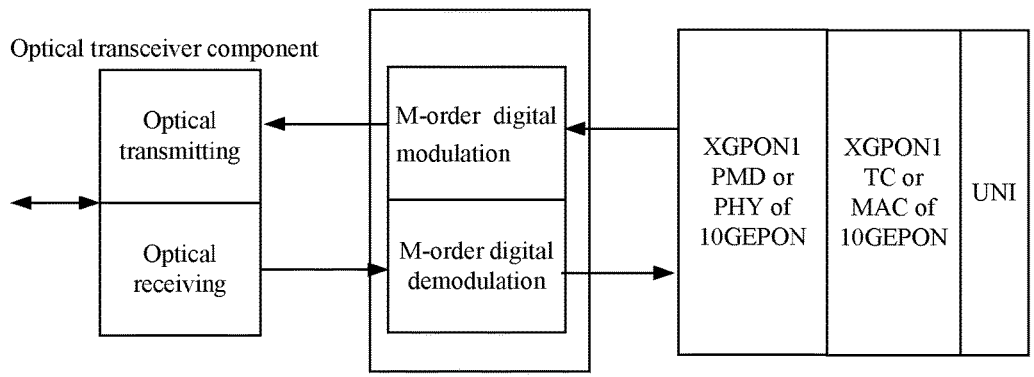
FIG. 16 is a first structure diagram of an XGPON1 ONU according to a second example embodiment of the disclosure.

In the uplink direction, the OFDM modulation and demodulation technology-based function chips convert the scrambled coded binary NRZ digital signals of the GPON and the XGPON1 into OFDM signals, the OFDM signals are processed by the optical component, and the modulated optical signals are output and transmitted on the ODN. The modulated optical signals are received and demodulated by the optical component at the receiving end of the ONU, the OFDM signals are converted into the scrambled coded NRZ digital signals of the GPON and the XGPON1 through the OFDM modulation and demodulation technology-based function chips, and the scrambled coded NRZ digital signals are transmitted to the receiving electric interfaces of the PMD electric chips. The line coding conversion upgrading of the ONU of the XGPON1 is finished, and the ONU is shown in FIG. 16 after being upgraded.

Figure 17:
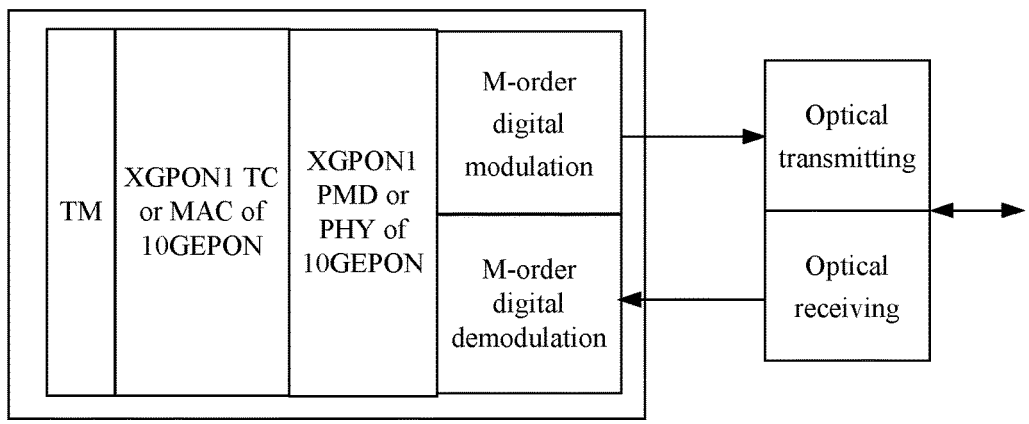
FIG. 17 is a second structure diagram of an XGPON1 OLT according to a second example embodiment of the disclosure.

Manner 2:

Digital modulation and demodulation conversion upgrading of the OLT of the XGPON1: an OFDM modulation and demodulation function and a PMD function are integrated in the same chip, as shown in FIG. 17.

Figure 18:
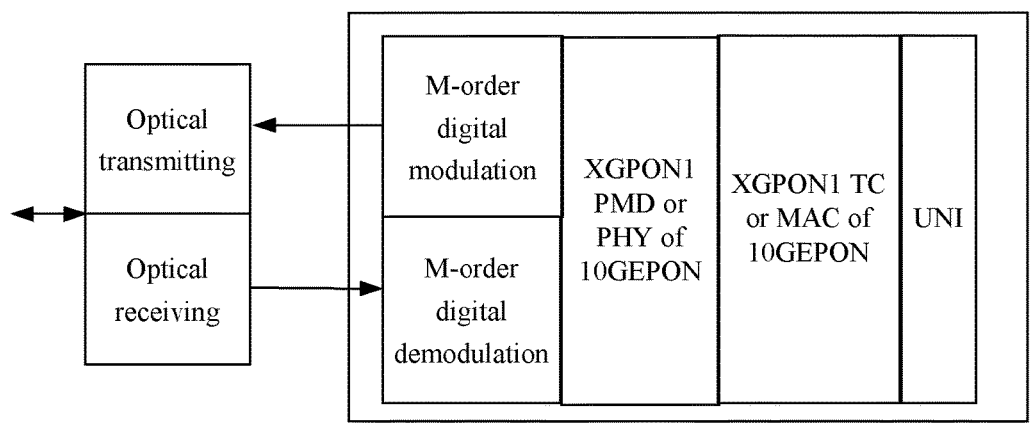
FIG. 18 is a second structure diagram of an XGPON1 ONU according to a second example embodiment of the disclosure.

Digital modulation and demodulation conversion upgrading of the ONU of the XGPON1: the OFDM modulation and demodulation function and the PMD function are integrated in the same chip, as shown in FIG. 18.

Figure 19:
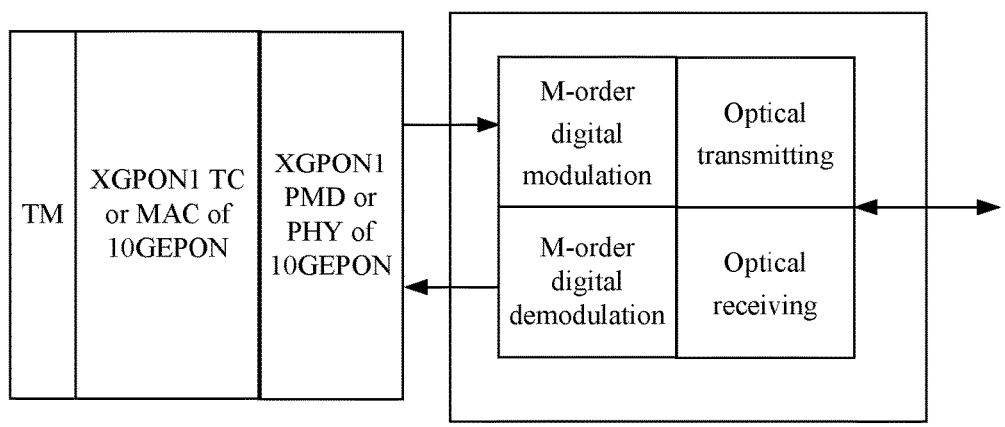
FIG. 19 is a third structure diagram of an XGPON1 OLT according to a second example embodiment of the disclosure.

Manner 3:

Digital modulation and demodulation conversion upgrading of the OLT of the XGPON1: the OFDM modulation and demodulation function and an optical component function are integrated in the same optical component package, as shown in FIG. 19.

Figure 20:
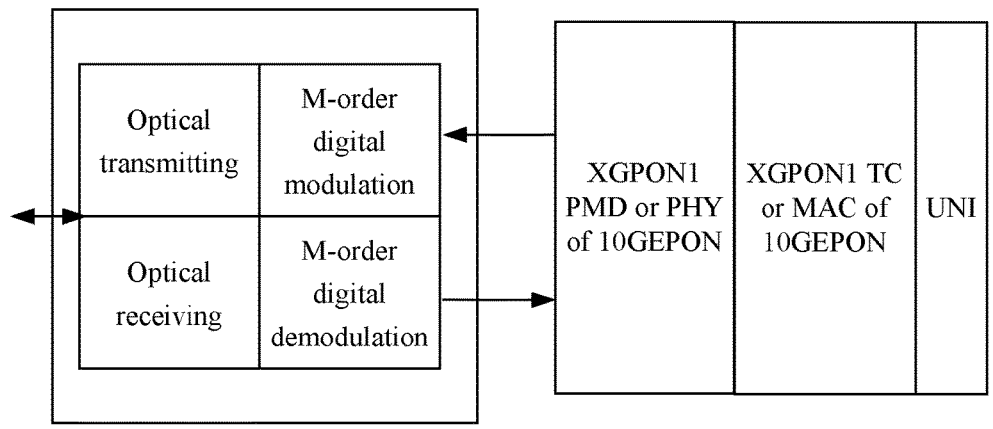
FIG. 20 is a third structure diagram of an XGPON1 ONU according to a second example embodiment of the disclosure.

Digital modulation and demodulation conversion upgrading of the ONU of the XGPON1: the OFDM modulation and demodulation function and the optical component function are integrated in the same optical component package, as shown in FIG. 20.

Third Optional Embodiment

Figure 21:
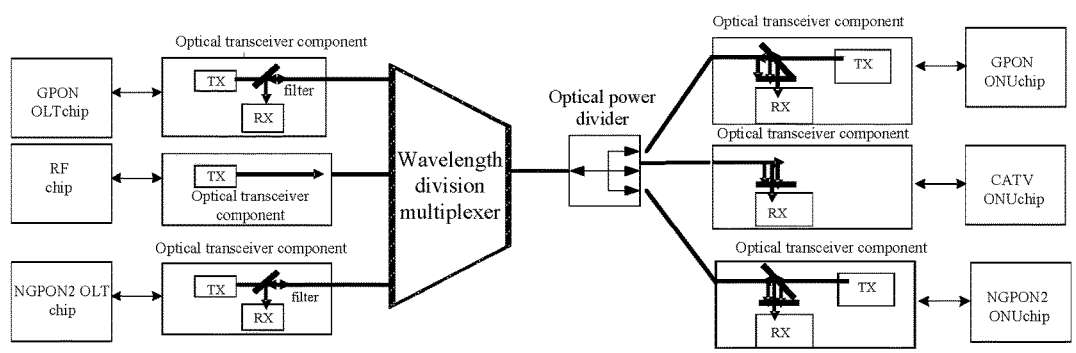
FIG. 21 is a network structure diagram of multi-network coexistence according to a third example embodiment of the disclosure.

FIG. 21 shows a structure diagram of a network supporting the coexistence of a GPON, an NGPON2 and an RF provided by the embodiment. An optical transceiver component of an OLT of an NGPON2 system transmits a downlink optical signal with the work rate of 10 Gbit/s and receives an uplink optical signal with the work rate of 2.5 Gbit/s or 10 Gbit/s, a transmitted downlink wavelength range is 1,530 nm to 1,540 nm, and uplink wavelength range which can be received is 1,600 nm to 1,625 nm. The wavelength range of an optical transmitting component of an RF video system is 1,550 nm to 1,560 nm. The downlink signal of the NGPON2, the downlink signal of the GPON and the downlink signal of the RF arrive at an optical transceiver component of an ONU supporting the NGPON2 system, an optical component of an ONU supporting the GPON system and an RF signal receiving component through an ODN of the system respectively after wavelength division of WDM1r shown in FIG. 21; and the uplink signal of the NGPON2 and the uplink signal of the GPON are transmitted to respective OLT ports after wavelength combination of the WDM1r shown in FIG. 21. The optical component of the ONU of the NGPON2 system receives the downlink optical signal with the work rate of 10 Gbit/s, and transmits the uplink optical signal with the work rate of 2.5 Gbit/s or 10 Gbit/s, the downlink wavelength range which can be received is 1,600 nm to 1,625 nm, and the transmitted uplink wavelength range is 1,530 nm to 1,540 nm. The optical component of the ONU of the GPON system receives the downlink optical signal with the rate of 2.5 Gbit/s, and receives the uplink optical signal with the rate of 1.25 Gbit/s, the downlink wavelength range which can be received is 1,480 nm to 1,500 nm, and the transmitted uplink wavelength range is 1,290 nm to 1,330 nm. The range of the received wavelengths of the RF signal receiving component is 1,550 nm to 1,560 nm.

Figure 22:
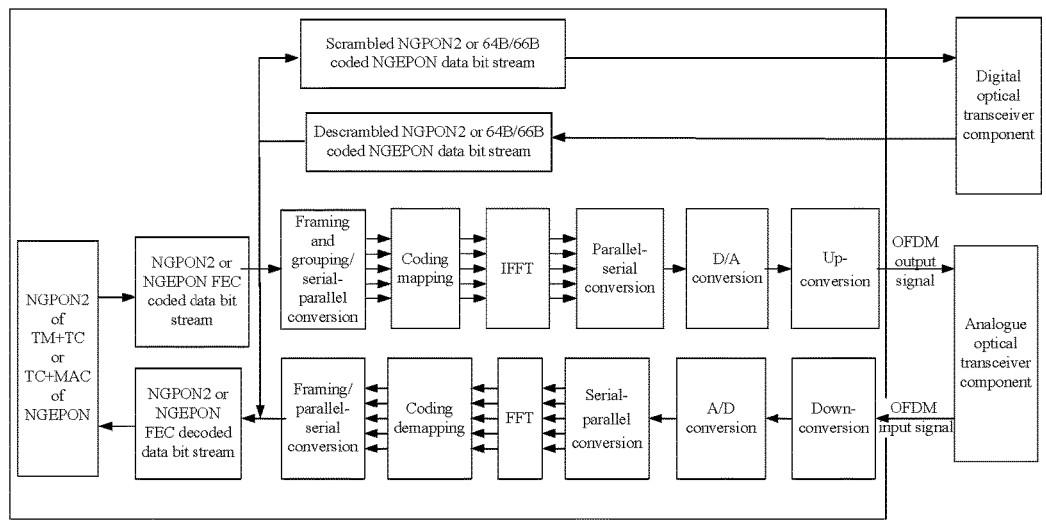
FIG. 22 is a structure diagram of an NGPON2 or NGE-PON in two working modes of binary digital modulation and OFDM according to a third example embodiment of the disclosure.

The OLT of the NGPON2 working in an OFDM debugging component comprises an ASIC chip and the optical component. The ASIC chip usually includes three functions, i.e. a TM function, a TC function and a PMD function. When the chip works in an OFDM modulation mode, for the transmitting direction, a data stream in a TC layer of the NGPON2 enters a PMD function component. The PMD function component directly performs OFMD processing after performing FEC coding on the data stream, and outputs the modulated data stream to the optical transceiver component for transmission. For the receiving direction, the optical signal is converted into an electric signal through the optical transceiver component, and the electric signal is transmitted to the PMD function component. The PMD function component receives the signal, and performs OFDM demodulation process for FEC decoding, and then transmits the data stream to the TC layer of the NGPON2. For the condition that the OFDM signal and an RF signal are not required to coexist in the same ODN, the ASIC chip can work in an ordinary binary modulation mode and transmit and receive the optical signal through an ordinary digital optical transceiver component, as shown in FIG. 3 and FIG. 22.

From the above, the embodiment of the disclosure achieves technical effects as follows:

by the embodiment of the disclosure, the problem of nonlinear Raman crosstalk of the downlink signal of the TDM PON system to the RF video system is solved, the quality of a part of a low-frequency channel of the RF video signal is optimized, and the RF and the TDM PON can coexist in the same ODN; and moreover, the cost of the optical transceiver component is reduced, and high practicability is achieved.

Obviously, those skilled in the art should know that each component or step of the embodiment of the disclosure can be implemented by a universal computing device, and the components or steps can be concentrated on a single computing device or distributed on a network formed by a plurality of computing devices, and can optionally be implemented by programmable codes executable for the computing devices, so that the components or steps can be stored in a storage device for execution with the computing devices, or can form each integrated circuit component, or multiple components or steps therein can form a single integrated circuit component for implementation. As a consequence, the disclosure is not limited to any specific hardware and software combination.

The above is only the example embodiment of the disclosure and not intended to limit the disclosure, and for those skilled in the art, the disclosure may have various modifications and variations. Any modifications, equivalent replacements, improvements and the like within the spirit and principle of the disclosure shall fall within the scope of protection of the disclosure.

What is claimed is:

1. A transmitting system of an optical network, comprising:
   first Passive Optical Network (PON) equipment, configured to output a binary digital signal;
   an M-order digital modulator, configured to modulate the binary digital signal into an M-order digital signal, and output the M-order digital signal, wherein each transmission symbol in the M-order digital signal carries information of $N=\log_2^M$ bits, where N is a natural number greater than 1 and M is a natural number;
   wherein the first PON equipment is further configured to output two paths of binary digital signals;
   wherein before modulating the input binary digital signal into the M-order digital signal, the M-order digital modulator further configured to judge whether to perform modulation by the M-order digital modulator or not; and based on that a judgment result is not to perform modulation by the M-order digital modulator, perform modulation through a binary digital modulator; wherein before judging whether to perform modulation by the M-order digital modulator or not, the the M-order digital modulator further configured to: judge whether to output both paths of received binary digital signals or not; based on that a judgment result is to output both paths of received binary digital signals, modulate the two paths of binary digital signals by the binary digital modulator and the M-order digital modulator respectively; and based on that a judgment result is not to output both paths of received binary digital signals, judge whether to perform modulation by the M-order digital modulator or not.

2. The system according to claim 1, wherein the system further comprises:
   second optical transmitting equipment, configured to perform optical modulation on one path of binary digital signal in the two paths of binary digital signals, and transmit a modulated binary optical signal.

3. The system according to claim 1, wherein the first PON equipment comprises one of: an Optical Line Terminal (OLT) and an Optical Network Unit (ONU), wherein the OLT includes three electric chips: a Transmission Media (TM) electric chip, a transmission convergence (TC) electric chip and a physical medium dependent (PMD) electric chip, as well as an optical component, and the ONU includes three electric chips: a User Network Interface (UNI) electric chip, a TC electric chip and a PMD electric chip, as well as an optical component.

4. The system according to claim 3, wherein the OLT at least comprises one of: a Gigabit Passive Optical Network (GPON) OLT, a 10-Gigabit-Capable Passive Optical Network (XG-PON1) OLT, a Radio Frequency (RF), and a Next-Generation Passive Optical Network (NGPON2) OLT; and the ONU at least comprises one of: a GPON ONU, an XGPON1 ONU, an RF and an NGPON2 ONU.

5. The system according to claim 1, wherein the M-order digital modulator comprises one of: Pulse Amplitude Modulation (PAM), Amplitude Shift Keying (ASK), Minimum Shift Keying (MSK), Phase Shift Keying (PSK), m Quadrature Amplitude Modulation (m-QAM), Discrete MultiTone (DMT), and Orthogonal Frequency Division Multiplexing (OFDM).

6. A communication system of an optical network, comprising: the transmitting system of the optical network according to claim 1 and a receiving system of the optical network, comprising:
   an M-order digital demodulator, configured to demodulate a received M-order digital signal into a binary digital signal and output the binary digital signal, wherein the received M-order digital signal is a signal modulated by a transmitting system through an M-order digital modulator, and each transmission symbol in the M-order digital signal carries information of $N=\log_2^M$ bits, where N is a natural number greater than 1 and M is a natural number;
   second Passive Optical Network (PON) equipment, configured to receive the demodulated binary digital signal, and perform corresponding operation according to the demodulated binary digital signal;
   wherein the second PON equipment comprises one of: an Optical Line Terminal (OLT) and an Optical Network Unit (ONU).

7. The system according to claim 1, wherein the system further comprises:
   first optical transmitting equipment, configured to perform optical modulation on the M-order digital signal, and transmit a modulated M-order optical signal.

8. A receiving system of an optical network, comprising:
   an M-order digital demodulator, configured to demodulate a received M-order digital signal into a binary digital signal and output the binary digital signal, wherein the received M-order digital signal is a signal modulated by a transmitting system through an M-order digital modulator, and each transmission symbol in the M-order digital signal carries information of $N=\log_2^M$ bits, where N is a natural number greater than 1 and M is a natural number;
   second Passive Optical Network (PON) equipment, configured to receive the demodulated binary digital signal, and perform corresponding operation according to the demodulated binary digital signal;
   wherein the second PON equipment comprises one of: an Optical Line Terminal (OLT) and an Optical Network Unit (ONU);
   wherein the received M-order digital signal is modulated by a M-order digital modulator, wherein the M-order digital modulator is configured to modulate the binary digital signal into an M-order digital signal, and output the M-order digital signal to the M-order digital demodulator, wherein before modulating the input binary digital signal into the M-order digital signal, the M-order digital modulator further configured to judge whether to perform modulation by the M-order digital modulator or not; and based on that a judgment result is not to perform modulation by the M-order digital modulator, perform modulation through a binary digital modulator; wherein before judging whether to perform modulation by the M-order digital modulator or not, the the M-order digital modulator further configured to: judge whether to output both paths of received binary digital signals or not based on that a judgment result is to output both paths of received binary digital signals, modulate the two paths of binary digital signals by the binary digital modulator and the M-order digital modulator respectively; and based on that a judgment result is not to output both paths of received binary digital signals, judge whether to perform modulation by the M-order digital modulator or not.

9. The system according to claim 8, wherein the system further comprises:
   second optical receiving equipment, configured to perform optical demodulation on a received binary optical signal, and output the binary digital signal obtained through the optical demodulation on the received binary optical signal.

10. The system according to claim 8, wherein the OLT includes three electric chips: a Transmission Media (TM) electric chip, a transmission convergence (TC) electric chip and a physical medium dependent (PMD) electric chip, as well as an optical component, and the ONU includes three electric chips: a User Network Interface (UNI) electric chip, a TC electric chip and a PMD electric chip, as well as an optical component.

11. The system according to claim 10, wherein the OLT at least comprises one of: a Gigabit Passive Optical Network (GPON) OLT, a 10-Gigabit-Capable Passive Optical Network, XG-PON1, OLT, a Radio Frequency (RF), and a Next-Generation Passive Optical Network (NGPON2) OLT; and the ONU at least comprises one of: a GPON ONU, an XGPON1 ONU, an RF and an NGPON2 ONU.

12. The system according to claim 8, wherein the M-order digital demodulator comprises one of: Pulse Amplitude Modulation (PAM), Amplitude Shift Keying (ASK), Minimum Shift Keying (MSK), Phase Shift Keying (PSK), m Quadrature Amplitude Modulation (m-QAM), Discrete MultiTone (DMT) and Orthogonal Frequency Division Multiplexing (OFDM).

13. The system according to claim 8, wherein the system further comprises:
   first optical receiving equipment, configured to perform optical demodulation on a received M-order optical signal, and output the M-order digital signal obtained through the optical demodulation.

14. A method for modulating a signal, comprising:
   modulating an input two paths of binary digital signal into an M-order digital signal by an M-order digital modulator, wherein each transmission symbol in the M-order digital signal carries information of $N=\log_2^M$ bits, where N is a natural number greater than 1 and M is a natural number;
   outputting the M-order digital signal by an optical network;
   wherein before modulating the input binary digital signal into the M-order digital signal by the M-order digital modulator, the method further comprises: judging whether to perform modulation by the M-order digital modulator or not; and based on that a judgment result is not to perform modulation by the M-order digital modulator, performing modulation through a binary digital modulator; wherein before judging whether to perform modulation by the M-order digital modulator or not, the method further comprises: judging whether to output both paths of received binary digital signals or not; based on that a judgment result is to output both paths of received binary digital signals, modulating the two paths of binary digital signals by the binary digital modulator and the M-order digital modulator respectively; and based on that a judgment result is not to output both paths of received binary digital signals, judging whether to perform modulation by the M-order digital modulator or not.

15. The method according to claim 14, wherein after outputting the M-order digital signal by the optical network, the method further comprises:
   demodulating a received M-order digital signal into a binary digital signal by an M-order digital demodulator; and
   an Optical Line Terminal (OLT) and an Optical Network Unit (ONU) performing corresponding operation according to the binary digital signal.

* * * * *